(12) United States Patent
Marquis

(10) Patent No.: US 10,124,841 B2
(45) Date of Patent: Nov. 13, 2018

(54) KINGPIN ASSEMBLY FOR SEMITRAILER

(71) Applicant: Jacques Marquis, Rimouski (CA)

(72) Inventor: Jacques Marquis, Rimouski (CA)

( * ) Notice: Subject to any disclaimer, the term of this patent is extended or adjusted under 35 U.S.C. 154(b) by 0 days.

(21) Appl. No.: 15/300,235

(22) PCT Filed: Mar. 31, 2015

(86) PCT No.: PCT/CA2015/050250
§ 371 (c)(1),
(2) Date: Sep. 28, 2016

(87) PCT Pub. No.: WO2015/149171
PCT Pub. Date: Oct. 8, 2015

(65) Prior Publication Data
US 2017/0183044 A1    Jun. 29, 2017

Related U.S. Application Data

(60) Provisional application No. 61/972,620, filed on Mar. 31, 2014.

(51) Int. Cl.
*B62D 53/08* (2006.01)
(52) U.S. Cl.
CPC ................ *B62D 53/0842* (2013.01)
(58) Field of Classification Search
CPC ................ B62D 53/0885; B62D 53/0842
See application file for complete search history.

(56) References Cited

U.S. PATENT DOCUMENTS

| | | | |
|---|---|---|---|
| 2,973,210 A * | 2/1961 | Sandefur | B62D 53/0842 280/433 |
| 3,887,251 A | 6/1975 | McKay | |
| 2,359,498 A | 10/1994 | Walther et al. | |
| 5,411,281 A | 5/1995 | Poirier | |
| 7,766,361 B2 | 8/2010 | Hungerink et al. | |
| 7,793,968 B1 | 9/2010 | Withers | |
| 2009/0108556 A1 | 4/2009 | Hungerink et al. | |

FOREIGN PATENT DOCUMENTS

| | | | |
|---|---|---|---|
| DE | 29821604 U1 * | 2/1999 | ............ B62D 53/08 |
| DE | 29821604 U1 | 2/1999 | |

* cited by examiner

*Primary Examiner* — Kevin Hurley
(74) *Attorney, Agent, or Firm* — Norton Rose Fulbright Canada LLP; Alexandre Daoust

(57) ABSTRACT

The kingpin assembly is securable to a semitrailer for engagement with a fifth wheel coupling of a towing vehicle, the kingpin assembly comprising: a rotation axis, a housing configured to be secured to the semitrailer, the housing having a cavity and an aperture leading to the cavity along the rotation axis, and a kingpin member having a base portion journaled in the cavity and a kingpin portion protruding from the aperture along the rotation axis for engagement with the fifth wheel coupling. In one embodiment, the kingpin member is journaled in the cavity via a polymeric bushing. In one embodiment, the housing is secured to the semitrailer via an assembly frame to which it is fastened with bolts, and a lock ring is used to prevent the heads of the bolts from rotating. In one embodiment, a swiveling plate is secured to the kingpin member.

16 Claims, 8 Drawing Sheets

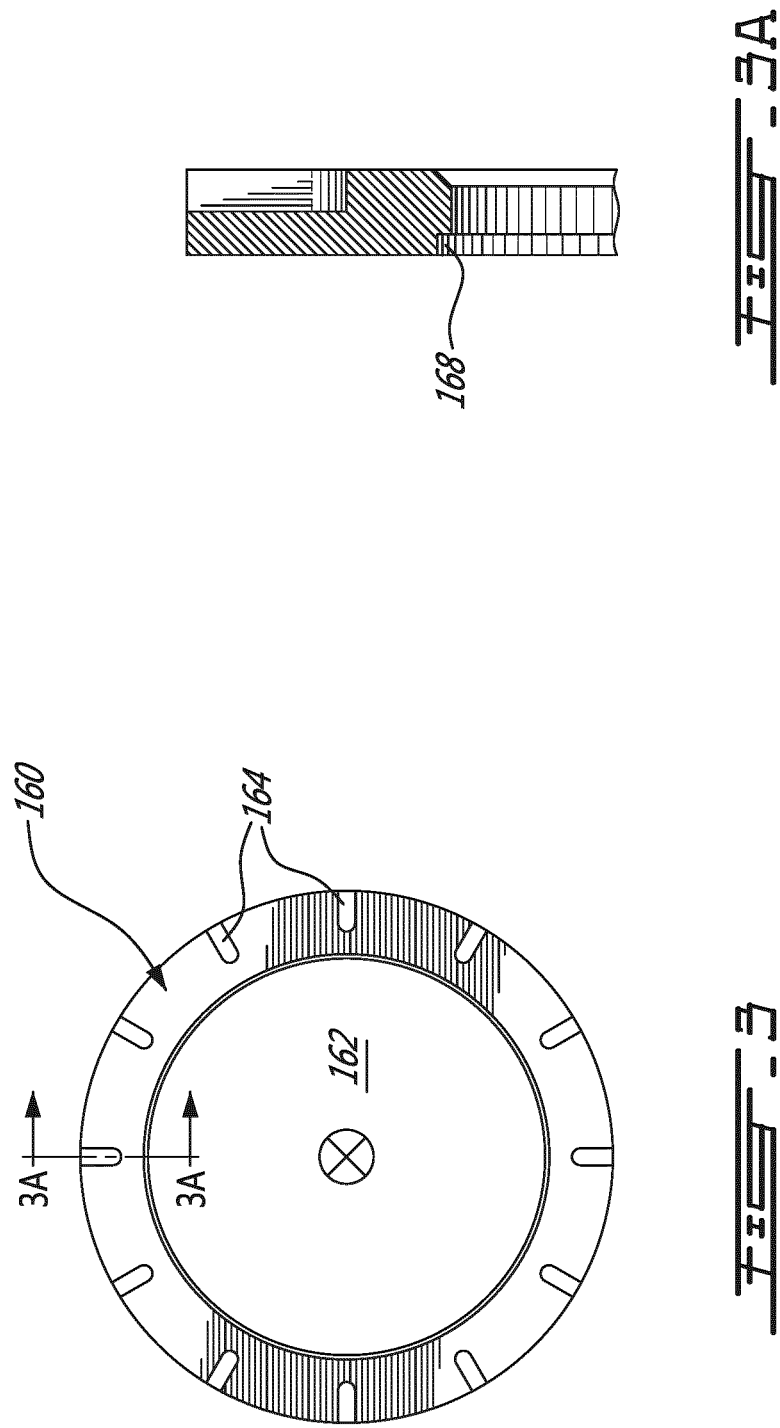

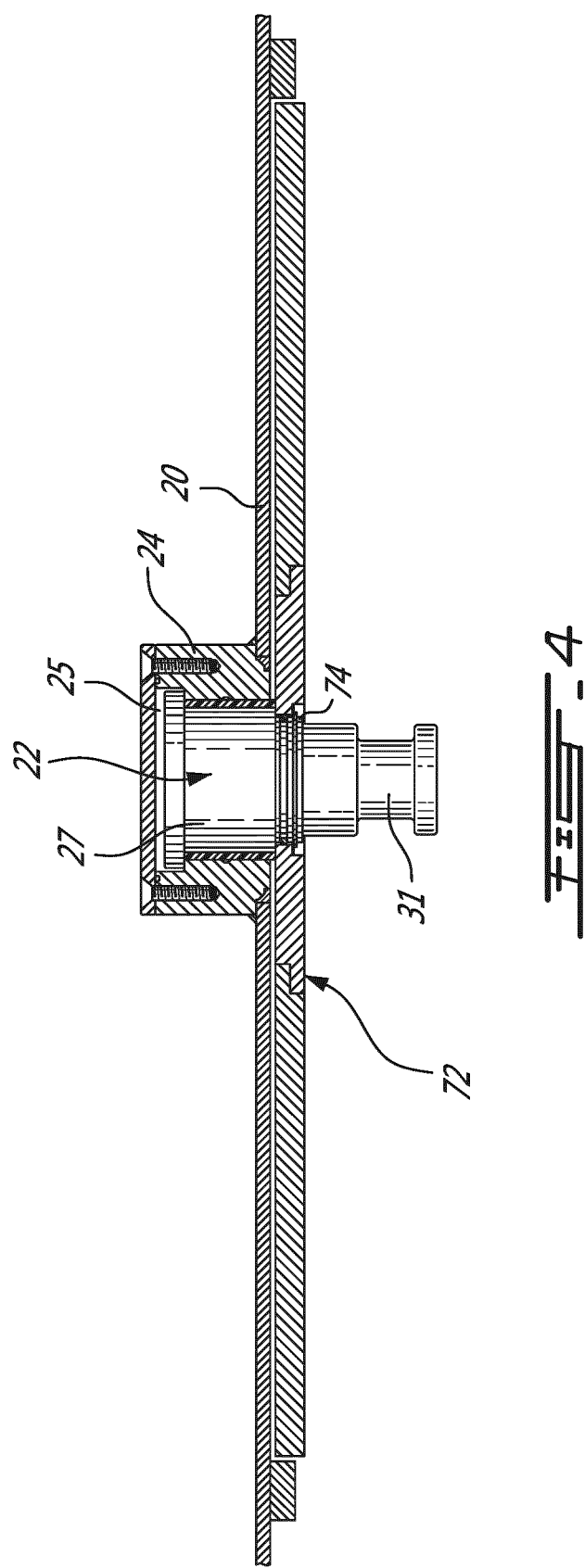

KINGPIN ASSEMBLY FOR SEMITRAILER

FIELD

The improvements generally relate to the field of fifth wheel couplings between semitrailers and traction vehicles, and more specifically to kingpin assemblies securable to semitrailers, for engagement with fifth wheel couplings of traction vehicles.

BACKGROUND

King pin assemblies having rotary kingpins and a swiveling plate to attach the semitrailer to the fifth wheel of a traction vehicle have been known for several years, as evidenced by U.S. Pat. No. 5,411,281. The swiveling of the plate and associated rotation of the kingpin were known to have advantages over non-rotary kingpin assemblies.

Although such assemblies were satisfactory to a certain degree, there remained room for improvement.

SUMMARY

In accordance with one aspect, there is provided a kingpin assembly securable to a semitrailer for engagement with a fifth wheel coupling of a towing vehicle, the kingpin assembly comprising: a rotation axis, a housing configured to be secured to the semitrailer, the housing having a cavity and an aperture leading to the cavity along the rotation axis, a polymeric bushing aligned with the rotation axis, and a kingpin member having a base portion journaled with the cavity via the polymeric bushing, and a kingpin portion protruding from the aperture along the rotation axis for engagement with the fifth wheel coupling.

Indeed, it was found that the use of a polymeric bushing amongst potentially other elements of a strategy to prevent contact between the relatively moving metal parts during use could significantly reduce the needs for lubrication.

In some embodiments, welding was used in the process of securing the housing to the semitrailer. In some of these embodiments, it was preferred to make the bushing integral to the kingpin member as opposed to making it integral to the housing to avoid exposing the polymeric material of the bushing to heat from the welding operation. Making the bushing integral to the kingpin member was also found to provide advantages on the maintenance front, in some embodiments.

In accordance with another aspect, there is provided a kingpin assembly securable to a semitrailer into a use configuration, for engagement with a fifth wheel coupling of a towing vehicle, the kingpin assembly comprising: a rotation axis, a housing configured to be secured to the semitrailer, the housing having a cavity and an aperture leading to the cavity along the rotation axis, a kingpin member having a base portion journaled in the cavity and a kingpin portion protruding from the aperture along the rotation axis for engagement with the fifth wheel coupling when in the use configuration, a plurality of fasteners being engageable in a circumferentially interspaced manner around the rotation axis to secure the housing relative to a main plate of the semitrailer in the use configuration, and a ring member having a plurality of bores formed therein, wherein each one of the bores is adapted to snugly receives a head of a corresponding one of the fasteners and prevents rotation thereof when in the use configuration.

Indeed, it was found that the use of the locking ring member could provide additional certainty to the effect that the fasteners will not unfasten over time.

In accordance with another aspect, there is provided a kingpin assembly securable to a semitrailer for engagement with a fifth wheel coupling of a towing vehicle, the kingpin assembly comprising: a rotation axis, a housing configured to be secured to the semitrailer, the housing having a cavity and aperture leading to the cavity along the rotation axis, a kingpin member having a base portion journaled in the cavity, a kingpin portion protruding from the housing along the rotation axis for engagement with the fifth wheel coupling, and a plate-mounting portion protruding from the housing along the rotation axis and located axially between the base portion and the kingpin portion; and a disc-shaped swiveling plate configured to be mounted to the plate-mounting portion of the kingpin member and to extend radially therearound during use.

Indeed, it was found advantageous to provide a configuration where the swiveling plate was secured to the plate-mounting portion which extended outside the cavity during use.

In accordance with one aspect, there is provided a semitrailer kingpin assembly for engagement with a fifth wheel coupling of a towing vehicle, the kingpin assembly comprising: a kingpin member extending from a first end to a second end along a rotation axis, having a base portion at the first end, a kingpin at the second end, and a plate-mounting portion therebetween, the plate-mounting portion having a plurality of circumferentially interspaced assembly tabs protruding radially therefrom; a disc-shaped swiveling plate having a kingpin face, a base face, a central aperture, and a locking portion having a plurality of circumferentially interspaced assembly apertures shaped to matingly receive the assembly tabs and extending axially from the base face to a receiving chamber, the assembly apertures being interspersed with locking tabs in a manner that the swiveling plate can be axially engaged with the kingpin member by engaging the kingpin into the central aperture, sliding along the axis until the assembly tabs engage the assembly apertures and subsequently engage the receiving chamber, and rotating the swiveling plate relative the kingpin member, about the axis, to axially trap the assembly tabs with the locking tabs; locking members axially engaging both the engaged assembly tabs and the locking tabs to prevent relative rotation therebetween; and a housing snugly and rotatably receiving the base portion of the kingpin member in a manner allowing the kingpin member to rotate therein about the rotation axis, the housing being fixedly mountable to the semitrailer.

In accordance with another aspect, there is provided a semitrailer kingpin assembly for engagement with a fifth wheel coupling of a towing vehicle, the kingpin assembly comprising: a kingpin member extending from a first end to a second end along a rotation axis, having a base portion at the first end, a kingpin at the second end, and a plate-mounting portion therebetween; a disc-shaped swiveling plate mounted to the plate-mounting portion of the kingpin member and extending radially therearound; a housing snugly and rotatably receiving the base portion of the kingpin member in a manner allowing the kingpin member to rotate therein about the rotation axis; an assembly frame secured to a fixed plate of the semitrailer, the assembly frame having a central aperture into which the housing is engaged; and a plurality of fasteners fastening the housing to the assembly frame.

In accordance with another aspect, there is provided a method of assembling a kingpin assembly to a semitrailer, the method comprising: welding an assembly frame to a fixed plate of the semitrailer along a periphery of the assembly frame, from above, the assembly frame having a central aperture; engaging a housing into the central aperture of the assembly frame from below, the housing snugly and rotatably receiving a kingpin member having a kingpin at a distal end thereof; and fastening the housing to the assembly frame from below.

Many further features and combinations thereof concerning the present improvements will appear to those skilled in the art following a reading of the instant disclosure.

DESCRIPTION OF THE FIGURES

In the figures,

FIG. 1A is a general view of a the kingpin assembly mounted to a flatbed semi-trailer in a disengaged state from the towing vehicle, seen from below in accordance with an embodiment;

FIG. 3 is a top plan view of a ring member of the embodiment of FIG. 2, shown alone;

FIG. 3A is a cross section view taken along cross-section lines 3A-3A of FIG. 3;

FIG. 4 is a cross-sectional view of another embodiment of a kingpin assembly mounted to a flatbed semitrailer;

DETAILED DESCRIPTION

Figure 1:
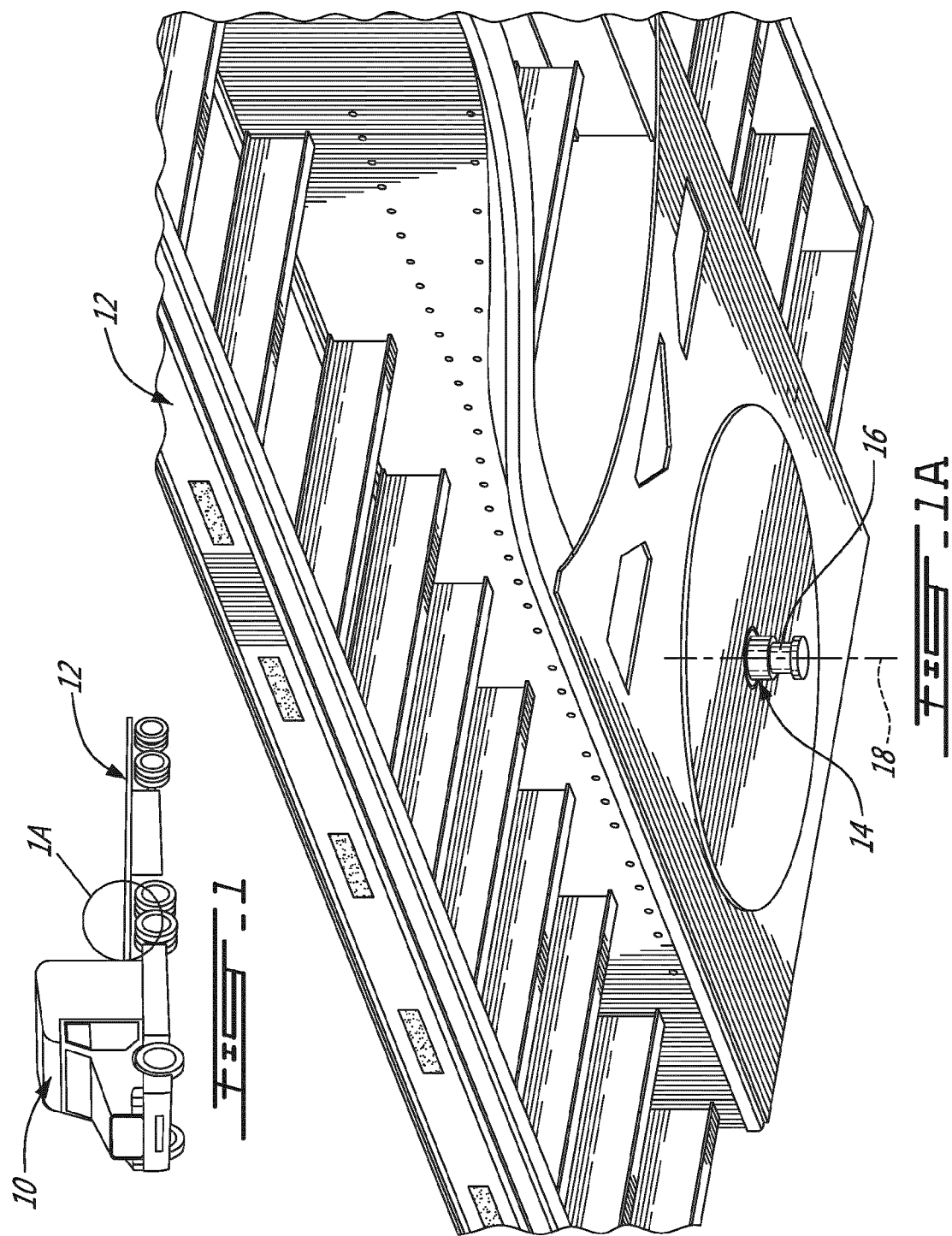
FIG. 1 is a general view of a towing vehicle and flatbed semi-trailer during use.

FIG. 1 shows an example of a vehicle 10 towing a flatbed semi-trailer 12. FIG. 1A shows a front portion of the semi-trailer, enlarged and seen from below, when the semi-trailer 12 is disengaged from the towing vehicle. The semi-trailer 12, has a kingpin assembly 14 having a kingpin portion 16. As will be understood by those skilled in the art, the semi-trailer 12 can be secured (or 'hitched') to the towing vehicle 10 for use by engaging the kingpin portion 16 of the semi-trailer 12 to a fifth-wheel coupling made integral to the towing vehicle 10. The coupling between the kingpin portion 16 and the fifth-wheel allows the semi-trailer 12 to pivot around a vertical pivot axis 18, as the towing vehicle 10 turns.

Figure 2:
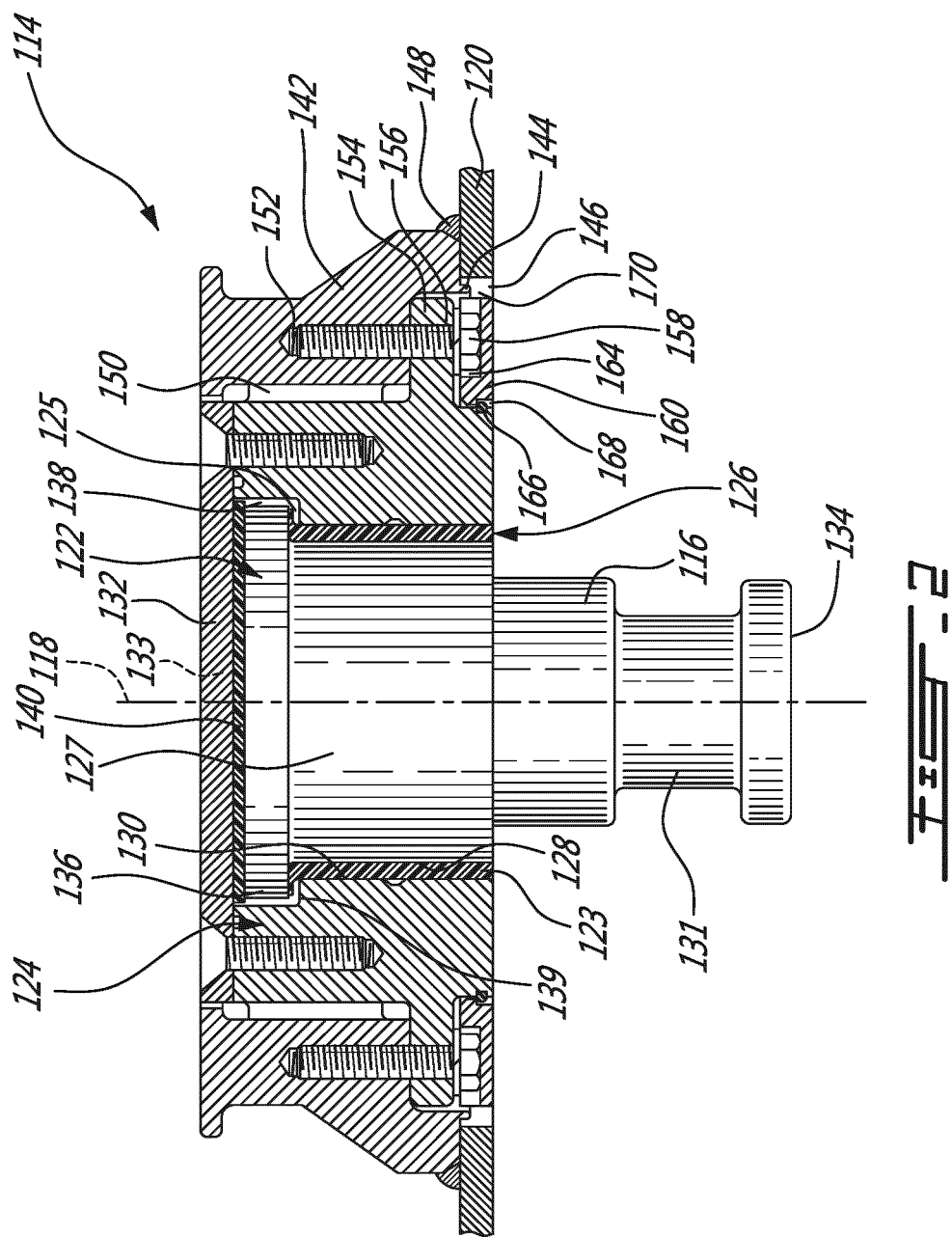
FIG. 2 is a cross-sectional view of another embodiment of a kingpin assembly mounted to a flatbed semitrailer.

FIG. 2 shows a first detailed example of a kingpin assembly 114 which is shown secured to a portion of a semi-trailer which will be referred to herein as the main plate 120 thereof. The kingpin assembly 114 has three main components: a kingpin member 122, a housing 124 and a bushing 126. The housing has an aperture 123 on a lower side thereof leading to a cavity 125. The kingpin member 122 has a base portion 127 which is journaled into the cavity via the bushing 126, and a kingpin portion 131 which protrudes axially from the aperture 123 for engagement with the fifth-wheel coupling of the towing vehicle. In this embodiment, the bushing 126 is made of one or more adjacent sleeves made of a polymeric material (e.g. a polymer or a suitable mix of polymers) and provides a low-friction interface with the internal cylindrical wall portion 130 of the cavity, allowing the kingpin member 122 to rotate around its rotation axis 118. The bushing 126 is provided here in the form of a single flanged sleeve which is interference-fitted to an external cylindrical wall 128 of the base portion 127 of the kingpin member 122, and has an external diameter which has a snug sliding fit (i.e. is slightly smaller than) with the internal cylindrical wall 130 of the cavity 125. In alternate embodiments, it can be preferred to make the bushing integral to the housing rather than making the bushing integral to the kingpin member.

In this embodiment, the kingpin member 122 can be installed to the housing 124 from above, via a removable cover 132 of the housing 124. More specifically, to install the kingpin member 122, the cover 132 is removed from the cover area 133, and a kingpin tip 134 of the kingpin member 122 is engaged across the cover area 133 until the external diameter of the bushing 126, which can be referred to as a neck of the base portion 127 since the bushing 126 is made integral to the kingpin member 122 in this embodiment, becomes engaged with the internal cylindrical wall 130 of the cavity 125. The downward axial movement is continued until the kingpin tip 134 of the kingpin member 122 is brought to protrude from the aperture 123 of the housing 124 (which is provided axially opposite from the cover 132), and until a circumferential flange 136, or head, of the kingpin member 122 becomes nested within a corresponding annular groove 138 in the housing 124, at which point further downward axial movement of the kingpin member 122 is prevented by abutment of the circumferential flange of the kingpin member 122, via the circumferential flange of the bushing 126, against a shoulder 139 provided in the form of a lower edge of the annular groove 138. In this embodiment, a cover bushing 140 in the form of a flat disc of a polymer material is then positioned on top of the kingpin member 122 before replacing the cover 132 at the cover area 133 and fastening it to the main body of the housing 124—the cover bushing 140 provides additional certainty that the kingpin member 122 will not touch the cover 132 during use. Accordingly, it can be said of this embodiment that the combination of the flanged sleeve bushing and the cover bushing 140 form part of a strategy to prevent contact between the relatively moving metal parts consisting of the kingpin member and the housing, during use. Moreover, it will be noted here that an O-ring is provided between the cover and the main body of the housing and that in this embodiment, this O-ring and the flanged sleeve bushing collaborate and form a system which seals the cavity from the environment.

It will be noted here that the portion of the kingpin member which is journaled in the bushing will be referred to herein as the base portion 127 of the kingpin member 122 and the portion of the kingpin member 122 which protrudes from the housing and engages the fifth wheel coupling (i.e. the kingpin itself) will be referred to herein as the kingpin portion 131 for ease of reference.

It will be noted here that in this embodiment, the bushing 126 is external to the base portion, and is journaled along an axial length which has more than 50% of the journaled diameter. The ratio between the journaled axial length (i.e. the axial length of the journaled portion of the bushing) of the bushing and the journaled diameter is relevant as it can provide leverage affecting the ability of the kingpin assembly to withstand torsion forces (e.g. a moment around an axis transversal to the rotation axis) which can be important during operations such as acceleration, braking, and turning of the towing vehicle. Preferably, the axial length will be at least 60% of the internal diameter.

In this embodiment, the housing 124 is secured to the main plate 120 of the semitrailer via an optional assembly frame 142. More specifically, for installation, the assembly frame 142 has an annular rib 144 formed on an underside thereof and which is shaped to matingly engage a circular aperture 146 formed in the main plate 120 of the semitrailer. This rib provides a 'fool-proof' way of localizing the correct relative position between the assembly frame 142 and the main plate 120 from above, without seeing the relative alignment between these components from below. Once the assembly frame 142 is correctly localized, it can be welded into place from above to form a weld joint 148. In this embodiment, the assembly frame 142 is provided as an initially separate component and is used between the main plate 120 and the housing 124. The assembly frame 142 can play a mechanical interface role, and can further be strengthened to play a structural role.

The assembly frame 142 has a central opening 150 formed therein which is specifically configured to matingly receive a corresponding external shape of the housing 124 from below. In this embodiment, the assembly frame 142 is provided with a plurality of circumferentially interspaced threaded bores 152 extending upwardly therein in the axial orientation, the housing 124 is provided with a flange 154 having a corresponding plurality of bores 156, and a corresponding plurality of fasteners 158, bolts in this case, are engaged into the threaded bores 152, across the housing bores 156, until heads thereof engage the underside of the flange 154 via lock washers. These fasteners 158 thus secure the housing 124 to the assembly frame 142.

It can be very inconvenient to weld overhead (from below). Accordingly, the assembly frame 142 can be welded from above. Once the assembly frame 42 is correctly positioned relative to the main plate 16, it can be welded into place. A locating precision tolerance of about ⅛" can be satisfactory in most applications. Once the assembly frame 142 is correctly welded to the main plate 120, the housing 124 can be engaged into the central aperture 150 provided inside the assembly frame 142, and the housing 124 can be fastened to the assembly frame 142 using the fasteners 158. It will be noted here that the step of fastening can be performed from below.

In this specific embodiment, a component which will be referred to herein as a locking ring member 160 is further used to snugly engage all the heads of the fasteners 158 and prevent the fasteners 158 from becoming unfastened. This component is more clearly shown in FIGS. 3 and 3A. More specifically, the ring member 160 has a central opening 162 allowing the kingpin member 122 to extend therethrough, and a plurality of blind bores 164 being defined therein in the axial orientation. Returning to FIG. 2, in this embodiment, the housing 124 is provided with a recessed O-ring 166 and the ring member 160 has a corresponding chamfer 167 and shoulder 168 whereby upon pushing the ring member 160 into engagement with the fasteners in an upward axial movement, the chamfer 167 first engages the O-ring 166 and compresses it against the housing, the O-ring 166 slides along the edge of the ring member 160, until the O-ring 166 eventually snaps back out under the sharp-edged shoulder 168 which then prevents the ring member 160 from coming back out. A spacing 170 can be left between the ring member 160 and the main plate 120 to allow insertion of a prying tool to remove the ring member 160 for maintenance, if desired.

Figure 4A:
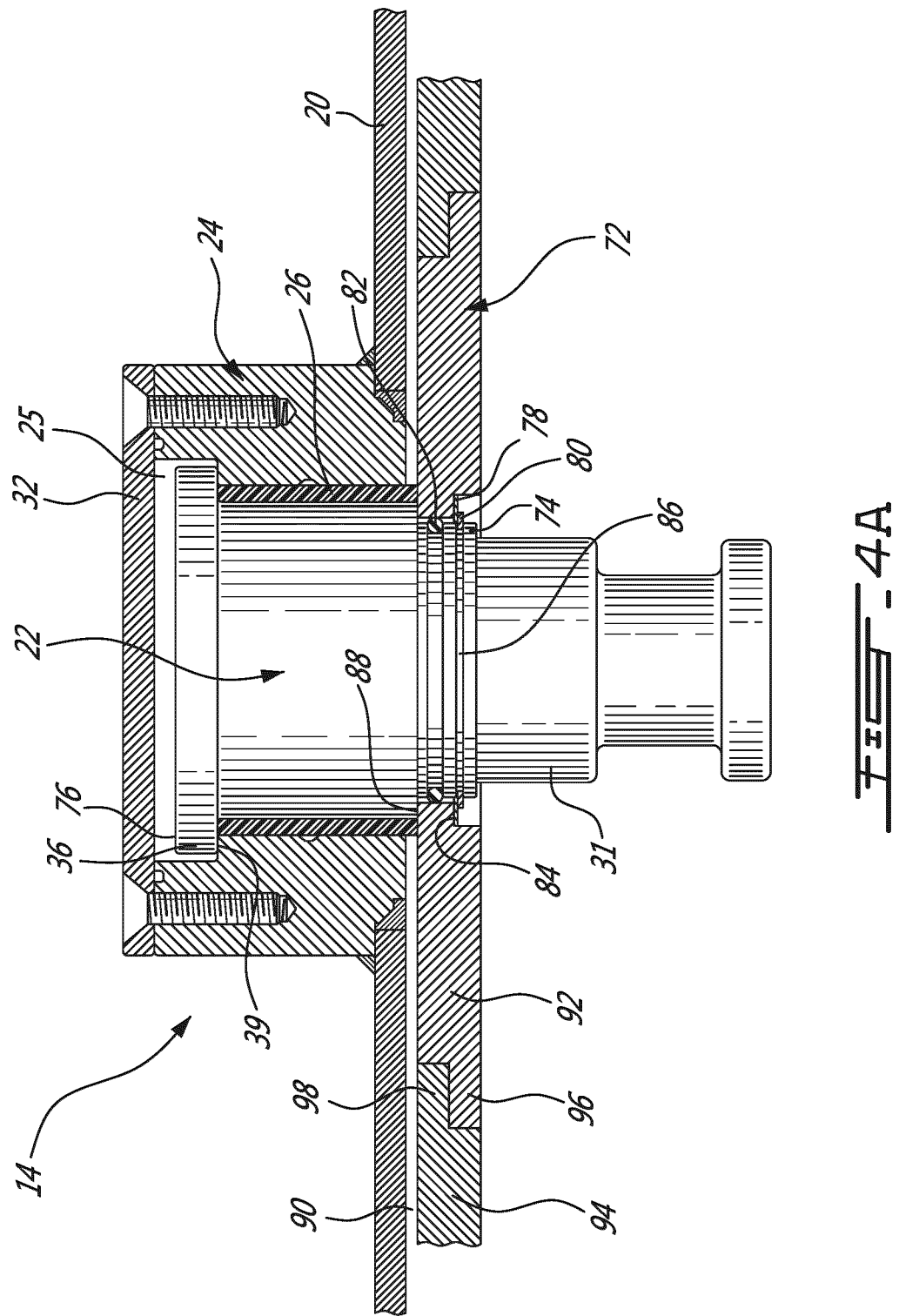
FIG. 4A is an enlarged portion of FIG. 4.

Turning now to FIGS. 4 and 4A, another detailed embodiment is shown. A first main difference between this embodiment and the embodiment of FIG. 2 is that in this embodiment, the housing 24 is directly secured to the main plate 20 of the semi-trailer, rather than via an assembly frame. A second main difference between this embodiment and the embodiment shown in FIG. 2 is that in this case, a swiveling plate 72 is provided with the kingpin member 22. More specifically, a swiveling plate 72 having the general shape of a disc is secured to a portion of the kingpin member 22 which will be referred to herein as the plate-mounting portion 74, the plate-mounting portion being axially located between the base portion 27 and the kingpin portion 31, outside the cavity 25.

Referring to FIG. 4A, it will be noted that as in the embodiment shown in FIG. 2, the kingpin portion 131 of the kingpin member 22 is narrower (e.g. has a smaller cross-sectional area over its entire length) than the journaled neck 76. In fact, having a kingpin member 22 which extends downwardly into a cross-sectional area which is equal to, or smaller than the cross-sectional of the journaled neck 76, can allow journaling the kingpin member 22 from above, when the cover 32 is removed, as described above. Accordingly, in this embodiment, the swiveling plate 72 is provided separate from the kingpin member 22 and is assembled to it once the kingpin portion 31 protrudes from the cavity 25. The same principle applies to the plate-mounting portion 74 which is provided here narrower than the journaled neck 76. In this embodiment, the plate-mounting portion 74 is optionally provided with a broader cross-sectional area that the cross-sectional area of the kingpin portion 31.

In the embodiment shown in FIG. 4A, three additional components are also provided: a washer 78, a snap ring 80 (or C-clip), and an O-ring 82. It will also be noted here that an annular shoulder 84 is defined in the underside of the swiveling plate 72, leading to the main central aperture of the swiveling plate which receives the kingpin member 22, and that the washer 78 is in abutment with the shoulder 84 to prevent the swiveling plate 72 from sliding axially off the kingpin member 22 when disengaged from the fifth-wheel coupling. Indeed, the assembly of the swiveling plate 72 can be performed as follows in this embodiment: the swiveling plate 72 is slid axially upwardly into its position in which the optional O-ring can provide a snug fit and seal with the plate-mounting portion 74; the washer 78 (or other suitable blocking member) is slid upwardly along the kingpin portion 31 and placed into abutment with the shoulder 84; and finally, the snap ring 80 is positioned inside an annular grove 86 provided in the plate-mounting portion 74 of the kingpin member 22, to prevent the washer 78, and thus the swiveling plate 72, from sliding downwardly along the kingpin member 22, thus keeping these components into place during use and storage of the semitrailer.

It will be noted that in this embodiment, a shoulder 88 is formed between the plate-mounting portion 74 and the journaled neck 76. Moreover, the inner opening of the swiveling plate 72 is smaller than the shoulder 88 in a manner that the swiveling plate 72 comes into abutment with the shoulder 88 when pushed upwardly from below. It will also be noted that the bushing 26 in this embodiment, though still made integral to the kingpin member 22 by interference fitting, does not have a flange such as in the embodiment shown in FIG. 2. Moreover, the journaled neck 76 has an axial length which is slightly greater than the axial length of the internal cylindrical wall of the cavity 25, which leaves a spacing 90 between the swiveling plate and the main plate when the semitrailer is removed from the fifth-wheel coupling of the towing vehicle and the kingpin member 22 is allowed to slide downwardly under the effect of gravity.

Accordingly, and given the absence of a flange in the bushing 26, the metal material of underside of the circumferential flange 36 (or head) of the kingpin member 22 can come into contact with the metal material of the shoulder 39 of the housing when the semitrailer is unused/in a storage configuration. Nonetheless, these metal components are not in contact with one another during use as, during use, the swiveling plate 72 is pushed upwardly by the fifth-wheel coupling of the towing vehicle which, in turn, pushes the kingpin member 22 upwardly, moving its upper flange 36 out from contact with the shoulder 39. Accordingly, the selection of the relative axial length of the journaled components forms part of the strategy to maintain the relatively rotating components out from contact with one another during use. It will also be noted here that the presence of a cover bushing is avoided here simply by designing the axial length of the annular groove in a manner to account for both the axial length of the circumferential flange and the axial length of the spacing, plus a safety margin or upper minimum axial length between the head of the kingpin member and the cover when the kingpin member is pushed to its maximal upward position.

The swiveling plate 72 can be made of a relatively lightweight polymer material, and normally rests onto an upper surface of the fifth wheel during use of the semitrailer 12. In this specific embodiment, the swiveling plate 72 is made of a central portion 92 and of a concentric peripheral portion 94, the central portion 92 having a lower outwardly-radially-protruding lip 96 onto which an upper inwardly-radially-protruding lip 98 rests under action of gravity. In an alternate embodiment, the swiveling plate 72 can be made of a single portion, or of more than two portions, and the different portions can be of the same or of different materials, polymeric or metal, as suitable to the specifics of the application.

Figure 5:
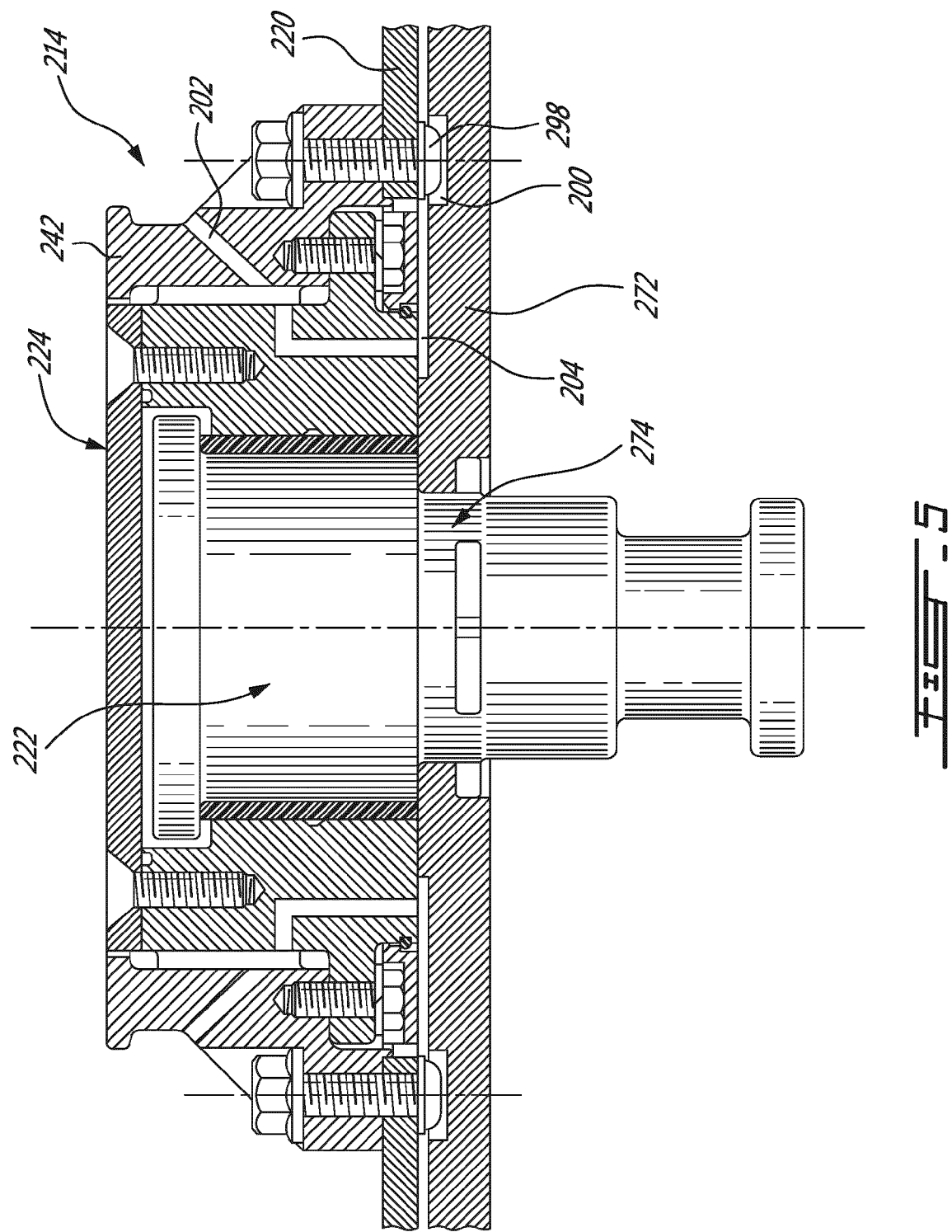
FIG. 5 is a cross-sectional view of the kingpin assembly of FIG. 1A, fragmented.
Figure 6:
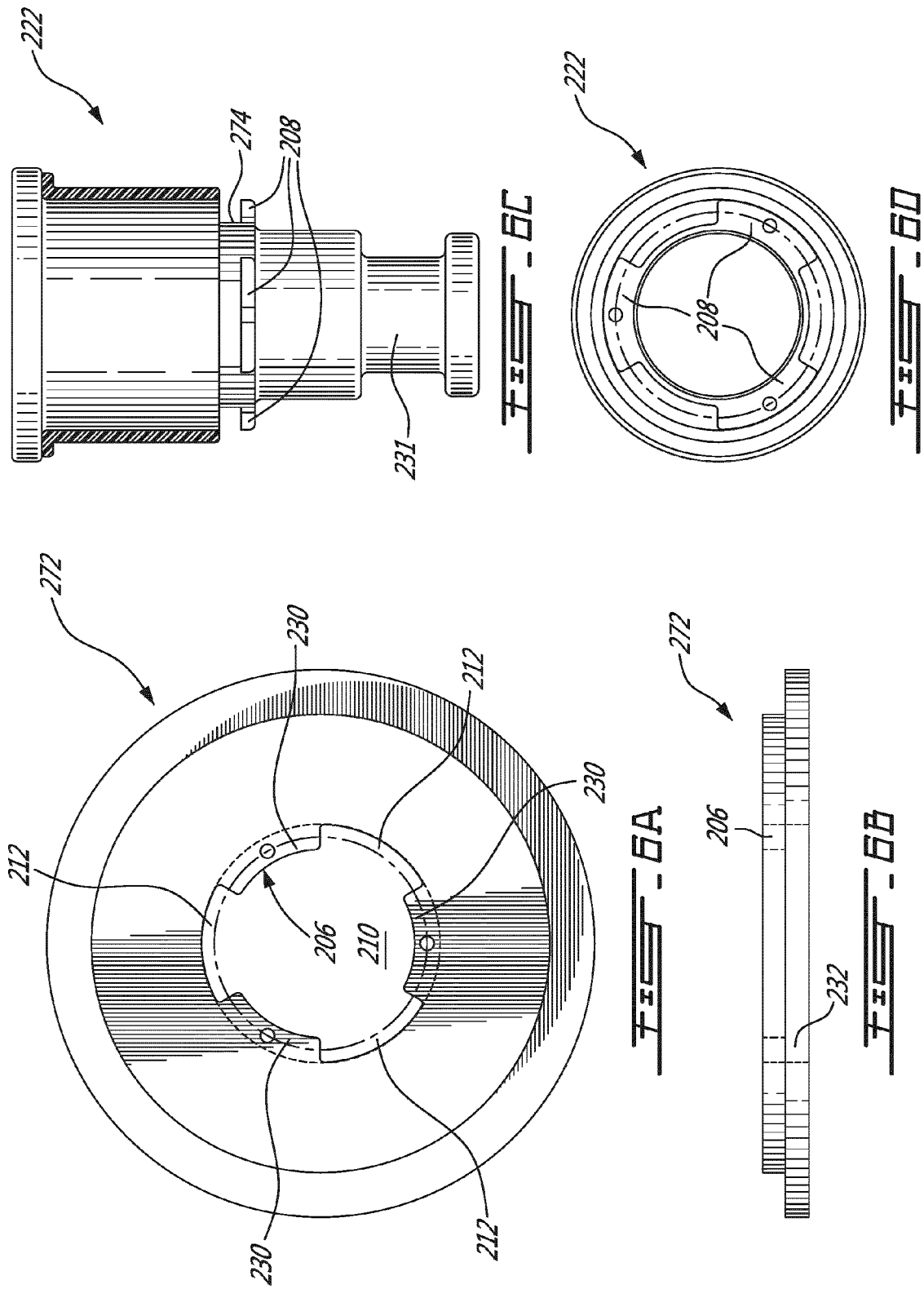
FIGS. 6A to 6D show various views of components of the kingpin assembly of FIG. 5.

Turning now to FIG. 5, still another detailed embodiment of a kingpin assembly 214 is shown. Main differences between the embodiment shown in FIG. 5 and the embodiment shown in FIG. 4A include the means of mounting the kingpin assembly to the main plate and the means of mounting the swiveling plate to the kingpin member.

Indeed, in this embodiment, the kingpin assembly 214 is mounted to the main plate 220 of the semi-trailer via threaded fasteners 298 engaged from underneath. The threaded fasteners 298 can be engaged with a separate assembly frame 242 to which the housing 224 is mounted, as shown, or directly into the housing and without a separate assembly frame, for instance. The heads of the fasteners 298 which protrude underneath the main plate 220 can be rendered unhindering to the rotary movement of the kingpin member 222 by an annular groove 200 being formed in the upper side of the swiveling plate 272, in embodiments where a swiveling plate 272 is used.

It will also be noted that in this embodiment, a grease path 202 is provided across the body of the fixed components of the kingpin assembly 214, the grease path leading to radial channels 204 provided in the upper face of the swiveling plate 272. This grease path can be used, for instance, to grease the components periodically or at installation. Moreover, it will be noted that the swiveling plate 272 is made of a single part as opposed to the two-part swiveling plate of FIG. 4A.

Turning now to FIGS. 6A to 6D, the specifics of the plate-mounting portion 274 and of a locking portion 206 of the swiveling plate 272 in this embodiment are shown in greater detail. The kingpin member 222 can be seen to have a plurality of circumferentially interspaced assembly tabs 208 having a given thickness and protruding radially from the kingpin member 222 at the plate-mounting portion 272. The locking portion 206 of the swiveling plate 272 is provided around a central aperture 210 of the swiveling plate 272, and includes a plurality of circumferentially interspaced assembly apertures 212 which correspond in shape to the assembly tabs 208 of the kingpin member 222, and which extend axially downwards from the base face of the swiveling plate 272 and lead to an annular receiving chamber 232 provided at a lower depth of the swiveling plate 272. The swiveling plate 272 can be securely mounted to the kingpin member 222 as follows: the kingpin portion 231 is engaged into the central aperture 210 of the swiveling plate 272, the swiveling plate 272 is slid axially along the kingpin portion 231 until the assembly tabs 208 engage the assembly apertures 212, and the axial movement is continued until the assembly tabs 208 fully engage the receiving chamber 232. At that point, the swiveling plate 272 is rotated relative to the kingpin member 222 until the assembly tabs 208 of the kingpin member 222 become axially engaged under the locking tabs 230 which are provided between the assembly apertures 212 in an interspersed manner therewith. Locking members such as polymer studs, pins, fasteners, or the like, can then axially engage aligned apertures in both each assembly tab 208 and the corresponding aligned locking tab 230 to prevent relative rotation therebetween.

Henceforth, during use, the swiveling plate 272 and the kingpin 222 can be integral to one another and collectively rotate upon rotational forces exerted by friction with the fifth wheel, relative to the housing 224 and the assembly frame 242 which are integral to the main plate 220.

It will be noted that given the fact that it can play an important role in the rotary function of the kingpin member, the journaled portions of the base portion and cylindrical wall can be selected to have a sufficient axial length relative to its diameter. On the other hand, it is desired to limit weight. The illustrated height/diameter ratio was found suitable while allowing a limited amount of weight.

It will also be noted that in this embodiment, the assembly frame 242 extends upwardly along a major portion of the axial length of the housing 224. This configuration was found satisfactory in some applications to secure the housing 224 and prevent the kingpin member 222 from rotating around a transversal axis beyond a given reasonable extent upon forces exerted to it by the fifth wheel.

Figure 7:
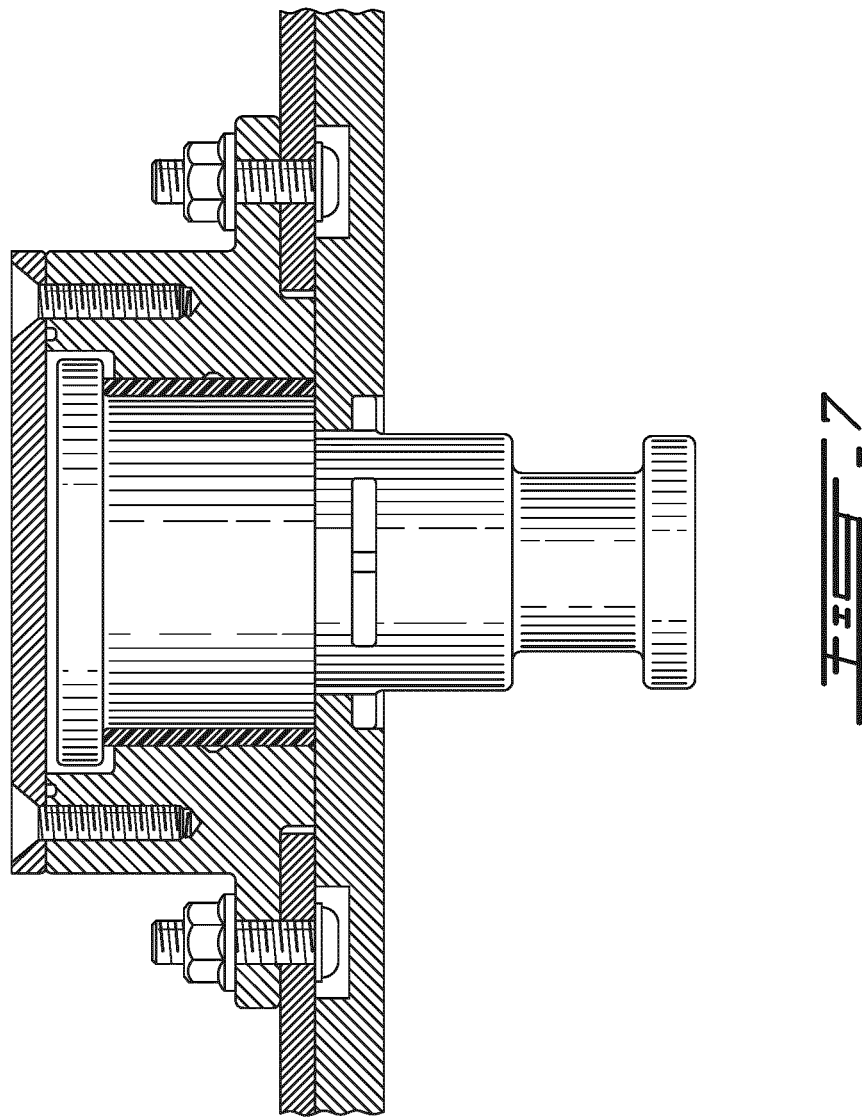
FIG. 7 is a cross-sectional view of still another embodiment of a kingpin assembly.

FIG. 7 shows still another embodiment where the housing is directly fastened to the main plate and where the kingpin member and swiveling plate are shown in their use positions, pushed upwardly such as by the fifth wheel coupling which is not shown.

As can be understood, the examples described above and illustrated are intended to be exemplary only. For instance, some embodiments may be better adapted to applications where the kingpin assembly is to be retrofitted to an existing semitrailer whereas other embodiments can be better adapted to applications where the kingpin assembly is manufactured together with the main plate of a semitrailer. Moreover, while the embodiments depicted in the figures show kingpin members which are elongated (i.e. have an axial length greater than its diameter at any point along its length), it can be preferred to provide kingpin members which are not elongated in some alternate embodiments. Moreover, it will be noted that the bushing can be comprised of a single component, or of a plurality of components, such as rings, provided in an axial-end to axial-end configuration, such as separated by annular ribs for instance. In embodiments where the bushing is made integral to the housing rather than being made integral to the base portion of the kingpin member, the journaled neck is the journaled portion of the base portion. Accordingly, the scope is indicated by the appended claims.

What is claimed is:

1. A kingpin assembly securable to a semitrailer into a use configuration, for engagement with a fifth wheel coupling of a towing vehicle, the kingpin assembly comprising: a rotation axis, a housing configured to be secured to the semitrailer, the housing having a cavity and an aperture leading to the cavity along the rotation axis, a kingpin member having a base portion journaled in the cavity and a kingpin portion protruding from the aperture along the rotation axis for engagement with the fifth wheel coupling when in the use configuration, a plurality of fasteners being engageable in a circumferentially interspaced manner around the rotation axis to secure the housing relative to a main plate of the semitrailer in the use configuration, and a ring member having a plurality of bores formed therein, wherein each one of the bores is adapted to snugly receives a head of a corresponding one of the fasteners and prevents rotation thereof when in the use configuration.

2. The kingpin assembly of claim 1 further comprising an assembly frame configured to be secured to the semitrailer into the use configuration, the assembly frame having a central opening formed therein along the rotation axis, the central opening being shaped to matingly receive the housing therein along the rotation axis, wherein the fasteners are configured to fasten the housing to the assembly frame into the use configuration.

3. The kingpin assembly of claim 1 wherein the housing has a main plate face configured for engagement against the main plate of the semitrailer into the use configuration with at least a major portion of the housing extending above the main plate, and wherein the fasteners are configured to fasten the housing to the main plate into the use configuration.

4. The kingpin assembly of claim 1 wherein the fasteners have threaded stems and hexagonal heads, and wherein in the use configuration, the housing is positioned above the main plate and the hexagonal heads collectively receive the ring member from below.

5. The kingpin assembly of claim 1 wherein the kingpin member has a plate-mounting portion located axially between the base portion and the kingpin portion, further comprising a disc-shaped swiveling plate mounted to the plate-mounting portion of the kingpin member and extending radially therearound when in the use configuration, wherein when in the use configuration, the ring member is covered by the swiveling plate and thereby prevented to fall downwardly under the effect of gravity.

6. The kingpin assembly of claim 1 wherein the kingpin member is journaled in the cavity via a polymeric bushing having an axial length being at least 50% of its internal diameter.

7. The kingpin assembly of claim 6 wherein the polymeric bushing is comprised of a single sleeve and the kingpin assembly is configured and adapted for the kingpin member to be kept out of contact with the housing during use and when the semitrailer pivots relative to the towing vehicle.

8. The kingpin assembly of claim 6 wherein the axial length of the polymeric bushing is of at least 60% of its internal diameter.

9. A kingpin assembly securable to a semitrailer for engagement with a fifth wheel coupling of a towing vehicle, the kingpin assembly comprising: a rotation axis, a housing configured to be secured to the semitrailer, the housing having a cavity and aperture leading to the cavity along the rotation axis, a kingpin member having a base portion journaled in the cavity, a kingpin portion protruding from the housing along the rotation axis for engagement with the fifth wheel coupling, and a plate-mounting portion protruding from the housing along the rotation axis and located axially between the base portion and the kingpin portion; and a disc-shaped swiveling plate configured to be mounted to the plate-mounting portion of the kingpin member and to extend radially therearound during use, wherein the housing has a main body and a cover removably secured to the main body at a cover area located axially opposite from the aperture, along the rotation axis; the cavity having an annular groove formed between the cover and a shoulder of the cavity; and the base portion has a circumferential flange nested within the annular groove, the kingpin member being removable from the housing by removing the cover and moving the kingpin member axially across the cover area.

10. The kingpin assembly of claim 9 wherein the cross-section area of the plate-mounting portion and of the kingpin portion is narrower than the cross-sectional area of the journaled base to allow removal of the kingpin member across the cover area.

11. The kingpin assembly of claim 9, wherein the plate-mounting portion has a plurality of circumferentially interspaced assembly tabs protruding radially therefrom; the swiveling plate has a kingpin face, a base face, a central aperture, and a locking portion having a plurality of circumferentially interspaced assembly apertures shaped to matingly receive the assembly tabs and extending axially from the base face to a receiving chamber, the assembly apertures being interspersed with locking tabs in a manner that the swiveling plate can be axially engaged with the kingpin member by engaging the kingpin into the central aperture, sliding along the axis until the assembly tabs engage the assembly apertures and subsequently engage the receiving chamber, and rotating the swiveling plate relative the kingpin member, about the axis, to axially trap the assembly tabs with the locking tabs; and locking members axially engaging both the engaged assembly tabs and the locking tabs to prevent relative rotation therebetween.

12. The kingpin assembly of claim 9 wherein the disc-shaped swiveling plate has a central portion and a peripheral portion, the central portion having a lower protruding lip, the peripheral portion having an upper protruding lip, the upper protruding lip being downwardly engaged against the lower protruding lip under the action of gravity.

13. The kingpin assembly of claim 9 wherein the kingpin member is journaled in the cavity via a polymeric bushing having an axial length being at least 50% of its internal diameter.

14. The kingpin assembly of claim 13 wherein the polymeric bushing is comprised of a single sleeve and the kingpin assembly is configured and adapted for the kingpin member to be kept out of contact with the housing during use and when the semitrailer pivots relative to the towing vehicle.

15. The kingpin assembly of claim 13 wherein the axial length of the polymeric bushing is of at least 60% of its internal diameter.

16. A kingpin assembly securable to a semitrailer for engagement with a fifth wheel coupling of a towing vehicle, the kingpin assembly comprising: a rotation axis, a housing configured to be secured to the semitrailer, the housing having a cavity and aperture leading to the cavity along the rotation axis, a kingpin member having a base portion journaled in the cavity, a kingpin portion protruding from the housing along the rotation axis for engagement with the fifth wheel coupling, and a plate-mounting portion protruding from the housing along the rotation axis and located axially between the base portion and the kingpin portion; and a disc-shaped swiveling plate configured to be mounted to the plate-mounting portion of the kingpin member and to extend radially therearound during use, wherein, the plate-mounting portion further comprises an annular groove having a snap ring secured in mating engagement therewith, further comprising a washer member located between the snap ring and an abutment of the swiveling plate, the washer member having an internal opening being larger than the cross-sectional area of the plate-mounting portion and smaller than a cross-sectional area of the engaged snap ring in a manner that the snap ring holds the swiveling plate via the washer when the kingpin assembly is removed from the fifth wheel coupling.

* * * * *